US012682470B2

(12) United States Patent
Fujimura

(10) Patent No.: US 12,682,470 B2
(45) Date of Patent: Jul. 14, 2026

(54) OBJECT TRACKING PARAMETER SETTING SUPPORT SYSTEM, MULTI-CAMERA OBJECT TRACKING SYSTEM, AND NON-TRANSITORY COMPUTER READABLE RECORDING MEDIA

(71) Applicant: AWL, INC., Tokyo (JP)

(72) Inventor: Hiroshi Fujimura, Tokyo (JP)

(73) Assignee: AWL, INC., Tokyo (JP)

( * ) Notice: Subject to any disclaimer, the term of this patent is extended or adjusted under 35 U.S.C. 154(b) by 0 days.

(21) Appl. No.: 19/008,734

(22) Filed: Jan. 3, 2025

(65) Prior Publication Data

US 2025/0232457 A1 Jul. 17, 2025

(30) Foreign Application Priority Data

Jan. 16, 2024 (JP) ................................. 2024-004505

(51) Int. Cl.
*G06V 20/52* (2022.01)
*G06T 7/246* (2017.01)
*G06T 7/292* (2017.01)

(52) U.S. Cl.
CPC .............. *G06T 7/292* (2017.01); *G06T 7/246* (2017.01); *G06T 2207/10016* (2013.01); *G06T 2207/30196* (2013.01); *G06V 20/52* (2022.01)

(58) Field of Classification Search
None
See application file for complete search history.

(56) References Cited

U.S. PATENT DOCUMENTS

2019/0217476 A1* 7/2019 Jiang ..................... G05D 1/0274
2021/0407103 A1* 12/2021 Tang ...................... G06V 40/25
2022/0343653 A1* 10/2022 Lee .......................... G06T 7/246
2025/0191372 A1* 6/2025 Roskowski ...... G08B 13/19671

OTHER PUBLICATIONS

Wojke et al. "Simple Online and Realtime Tracking With a Deep Association Metric", arXiv:1703.07402v1 [cs.CV], Mar. 21, 2017, 5 pages.

* cited by examiner

*Primary Examiner* — Eileen M Adams
(74) *Attorney, Agent, or Firm* — Oblon, McClelland, Maier & Neustadt, L.L.P.

(57) ABSTRACT

An object tracking parameter setting support system includes an input circuitry configured to receive an input of captured images from a plurality of cameras, a multi-camera object tracking circuitry configured to perform multi-camera object tracking of tracking a plurality of tracking target objects across photographing ranges of the plurality of cameras on the basis of captured images from the plurality of cameras, a movable path estimation circuitry configured to perform multi-camera object tracking by the multi-camera object tracking circuitry on captured images in a predetermined period from the plurality of cameras, and estimate a movable path that which is a path between cameras on which a person is able to move, from statistical information of tracking results of the tracking, and a setting circuitry configured to set information of the movable path estimated by the movable path estimation circuitry as one of parameters used for the multi-camera object tracking.

16 Claims, 11 Drawing Sheets

FIG. 4

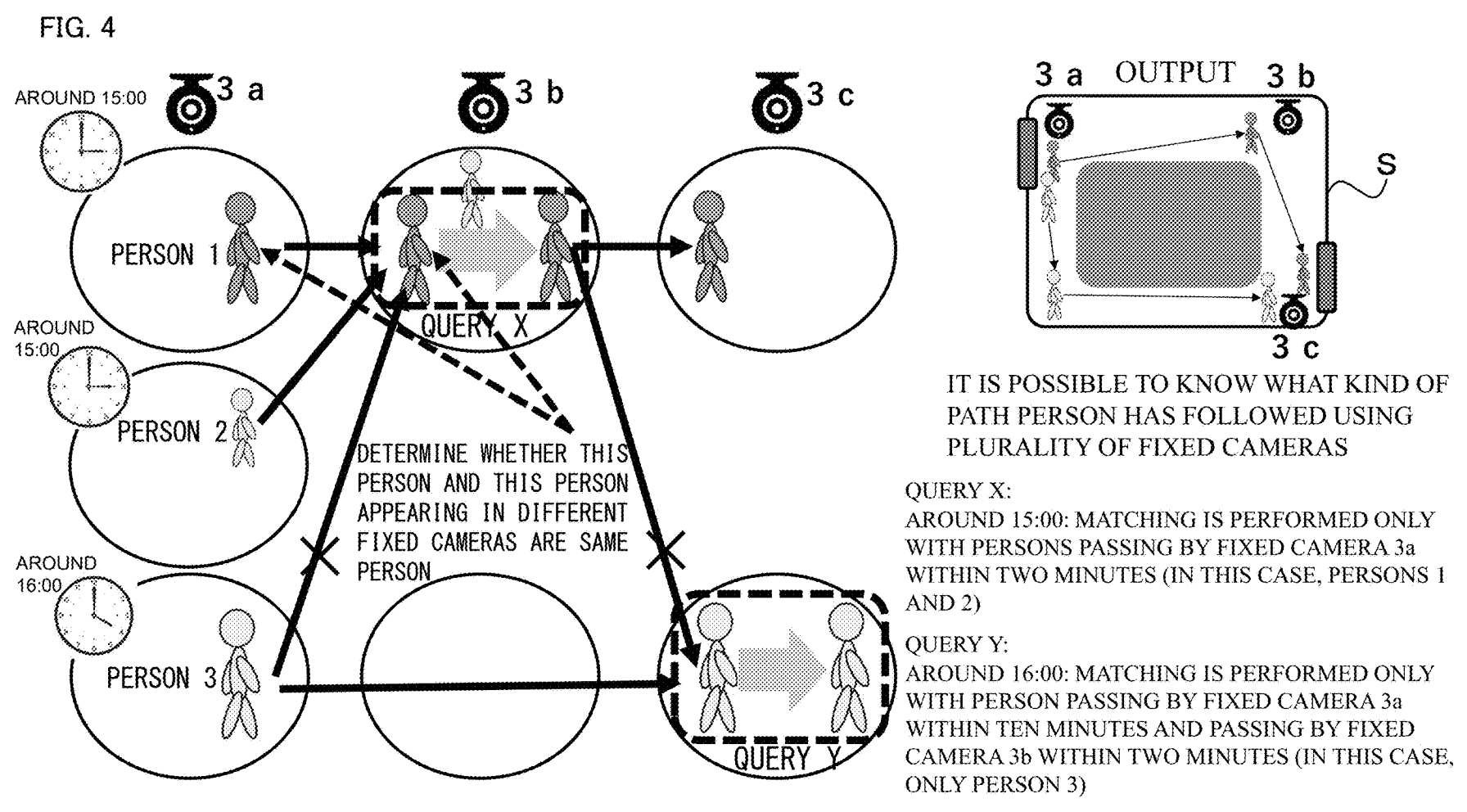

IT IS POSSIBLE TO KNOW WHAT KIND OF PATH PERSON HAS FOLLOWED USING PLURALITY OF FIXED CAMERAS

QUERY X:
AROUND 15:00: MATCHING IS PERFORMED ONLY WITH PERSONS PASSING BY FIXED CAMERA 3a WITHIN TWO MINUTES (IN THIS CASE, PERSONS 1 AND 2)

QUERY Y:
AROUND 16:00: MATCHING IS PERFORMED ONLY WITH PERSON PASSING BY FIXED CAMERA 3a WITHIN TEN MINUTES AND PASSING BY FIXED CAMERA 3b WITHIN TWO MINUTES (IN THIS CASE, ONLY PERSON 3)

FIG. 7   TWO-DIMENSIONAL STORE MAP 60

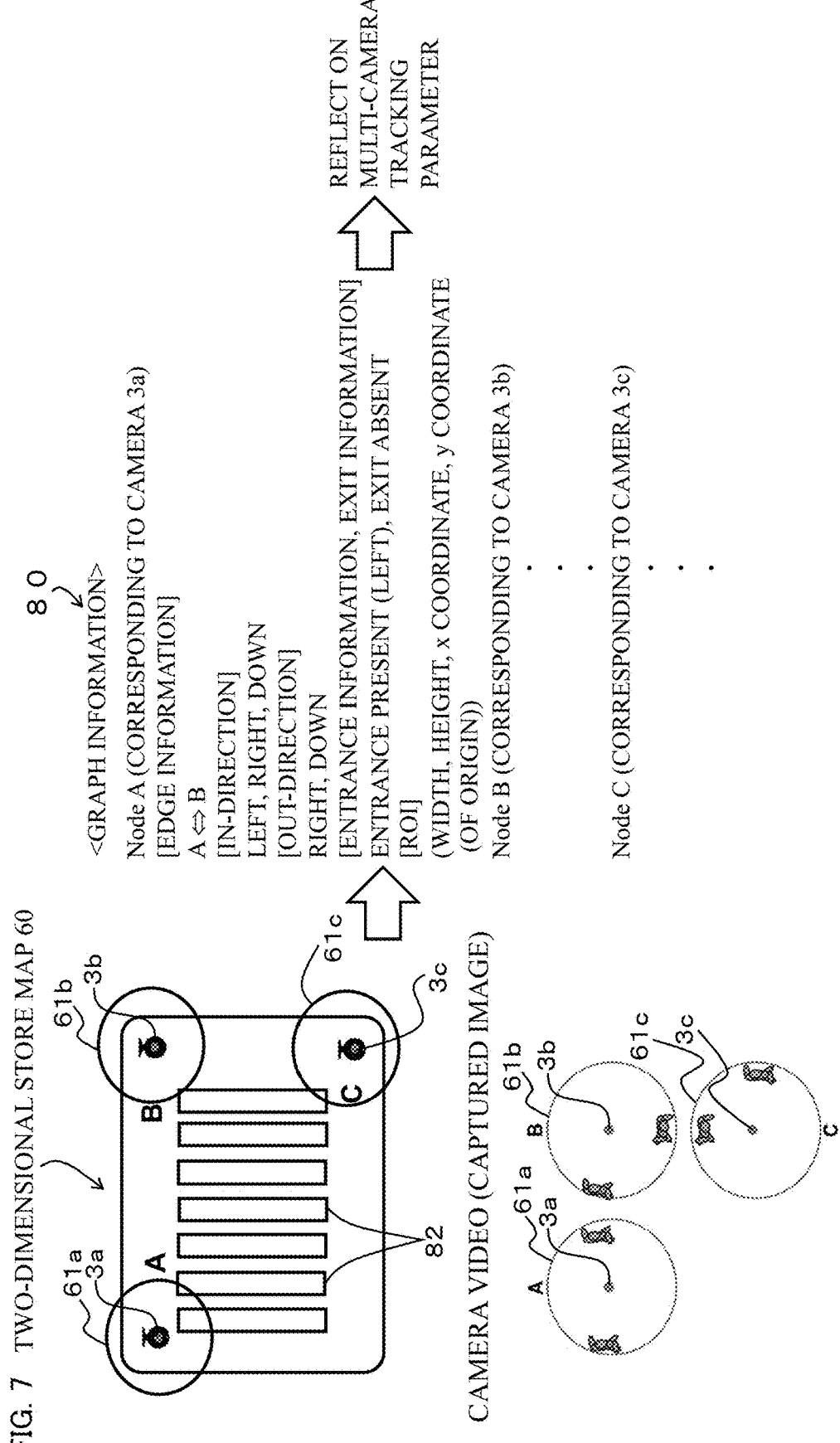

80

<GRAPH INFORMATION>

Node A (CORRESPONDING TO CAMERA 3a)
[EDGE INFORMATION]
A⇔B
[IN-DIRECTION]
LEFT, RIGHT, DOWN
[OUT-DIRECTION]
RIGHT, DOWN
[ENTRANCE INFORMATION, EXIT INFORMATION]
ENTRANCE PRESENT (LEFT), EXIT ABSENT
[ROI]
(WIDTH, HEIGHT, x COORDINATE, y COORDINATE
(OF ORIGIN))
Node B (CORRESPONDING TO CAMERA 3b)

Node C (CORRESPONDING TO CAMERA 3c)

REFLECT ON MULTI-CAMERA TRACKING PARAMETER

CAMERA VIDEO (CAPTURED IMAGE)

FIG. 9

Node A (CORRESPONDING TO CAMERA 3a)

[EDGE INFORMATION]
A⇔B, A⇔D
→ ESTIMATED FROM STATISTICAL INFORMATION OF MULTI-CAMERA OBJECT TRACKING RESULTS WITHOUT LIMITATION

STATISTICAL INFORMATION 81 OF MULTI-CAMERA OBJECT
TRACKING RESULTS WITHOUT LIMITATION
A→B 100
A→C 2
A→D 98
B→A 97
B→C 93
B→D 2
C→A 1
C→B 50
C→D 63
D→A 43
D→B 2
D→C 97

THRESHOLD IS PROVIDED, AND PATH EQUAL TO OR LESS THAN
THRESHOLD IS NOT USED

TWO-DIMENSIONAL STORE MAP 60

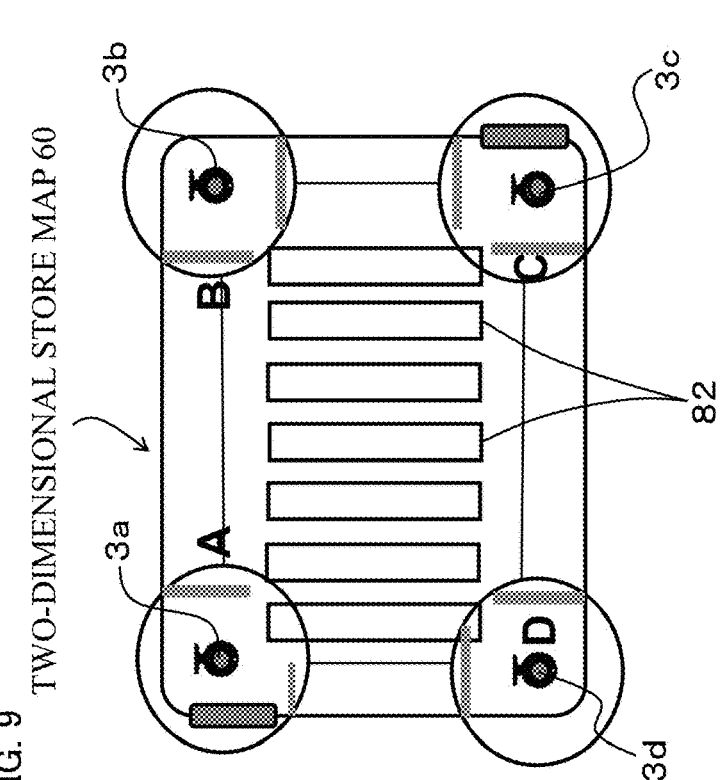

3a
3b
3c
3d
A
B
C
D
82

TWO-DIMENSIONAL STORE MAP 60

ENTRANCE AREA 58

EXIT AREA 59

Node A (CORRESPONDING TO CAMERA 3a)

[ENTRANCE INFORMATION, EXIT INFORMATION]

STATISTICAL INFORMATION 83 OF MULTI-CAMERA OBJECT
TRACKING RESULTS WITHOUT LIMITATION

ABC 120
ADC 115
ABADC 30
ADABC 40
~~BCD 5~~
~~BAC 1~~
~~CBA 2~~

THRESHOLD IS PROVIDED, AND ROUTE EQUAL TO OR LESS THAN
THRESHOLD IS NOT USED

IN-AREA AND OUT-AREA ARE SET FROM STATISTICAL INFORMATION OF SINGLE CAMERA OBJECT TRACKING RESULTS

OBJECT TRACKING PARAMETER SETTING SUPPORT SYSTEM, MULTI-CAMERA OBJECT TRACKING SYSTEM, AND NON-TRANSITORY COMPUTER READABLE RECORDING MEDIA

CROSS-REFERENCE TO RELATED APPLICATION

This application is based on and claims the benefit of priority of the prior Japanese Patent Application No. 2024-004505, filed on Jan. 16, 2024, the entire contents of which are incorporated herein by reference.

BACKGROUND OF THE INVENTION

1. Field of the Invention

The present invention relates to an object tracking parameter setting support system, a multi-camera object tracking system, an object tracking system, a non-transitory computer readable recording medium for recording an object tracking parameter setting support program, a non-transitory computer readable recording medium for recording a multi-camera object tracking program, and a non-transitory computer readable recording medium for recording an object tracking program.

2. Description of the Related Art

Conventionally, a technology of multi-camera object tracking, in which a plurality of cameras is installed in a certain area and an object (an object such as a person) within a photographing range of the plurality of cameras is tracked using captured images of the cameras, is known (see, for example, Nicolai Wojke, Alex Bewley, Dietrich Paulus, "SIMPLE ONLINE AND REALTIME TRACKING WITH A DEEP ASSOCIATION METRIC", [online], Mar. 21, 2017, University of Koblenz-Landau, Queensland University of Technology, [searched on Jan. 6, 2023], the Internet <URL:https://userpages.uni-koblenz.de/~agas/Documents/Wojke2017SOA.pdf>). To be precise, this multi-camera object tracking is tracking a plurality of tracking target objects across (captured images of) a plurality of cameras while considering occlusion (which is hiding of the tracking target object from the camera and occurs, for example, when the tracking target object is hidden by another object or when the tracking target object enters or leaves the photographing range of the camera). By using the above-described multi-camera object tracking technology, it is possible to confirm the safety of the tracking target object, analyze the behavior of the tracking target object, and use the analysis result for reconsideration of arrangement of paths and objects in the area where the camera is installed.

It is important to add a physical restriction of a building (facility) as information to a system in which a plurality of cameras is installed in a facility such as a store and a flow of individual people is confirmed, like the above-described system that performs multi-camera object tracking. For example, in a case where it is necessary to always pass through a photographing range of a camera B in order to go from a certain camera A to a camera C due to physical restrictions of the building (facility) (for example, a case where there is an obstacle on a path directly connecting the camera A and the camera C, or the like), basically, the flow of people from the camera A directly (linearly) toward the camera C does not occur, and data of tracking results (of people) passing through such a path needs to be eliminated. That is, in performing multi-camera object tracking, information regarding a path ("movable path") between cameras, on which a person is able to move, is important. This "movable path" is often represented graphically. Specifically, in many cases, each camera is set as a node (vertex) in a graph, and the above-described movable path (path between cameras on which a person is able to move) is set as an edge (line connecting a vertex and a vertex) in the graph.

In order to ensure the accuracy and speed of the multi-camera object tracking processing, it is very effective to utilize various kinds of spatial information including information regarding the above-described movable path. The spatial information includes in-information (information of an in-area which is an area where a person enters in a photographing range of each camera) and out-information (information of an out-area which is an area from which a person goes out in a photographing range of each camera) with respect to the photographing range of each camera in the facility, information of areas at an entrance and an exit of the facility, information of a region of interest (a region through which the tracking target person is able to pass or a region through which the tracking target person is unable to pass) in the photographing range of each camera in the facility, and mapping information between a captured image of each camera in the facility and the map of the facility (in-building drawing). Note that the mapping information means information of association between each point (each coordinate) in the captured image (captured range) of each camera and each point in the map of the facility.

BRIEF SUMMARY OF THE INVENTION

As described above, in order to ensure the accuracy and processing speed of multi-camera object tracking, it is very effective to utilize various types of spatial information including information regarding a movable path. However, manually setting the above spatial information requires economical and temporal costs.

The present invention has been made to solve the above problems, and an object thereof is to provide an object tracking parameter setting support system, a multi-camera object tracking system, an object tracking system, a non-transitory computer readable recording medium for recording an object tracking parameter setting support program, a non-transitory computer readable recording medium for recording a multi-camera object tracking program, and a non-transitory computer readable recording medium for recording an object tracking program, which are capable of automatically setting various kinds of spatial information such as a movable path necessary for securing accuracy and speed of multi-camera object tracking processing, saving labor of manually setting these kinds of spatial information, and achieving accurate and high-speed multi-camera object tracking processing while suppressing economic and temporal costs.

In order to solve the above problems, an object tracking parameter setting support system according to a first aspect of the present invention includes an input circuitry configured to receive an input of captured images from a plurality of cameras, a multi-camera object tracking circuitry configured to perform multi-camera object tracking of tracking a plurality of tracking target objects across photographing ranges of the plurality of cameras on the basis of captured images from the plurality of cameras, a movable path estimation circuitry configured to perform multi-camera object tracking by the multi-camera object tracking circuitry on captured images in a predetermined period from the plurality of cameras, and estimate a movable path that which is a path between cameras on which a person is able to move, from statistical information of tracking results of the tracking, and a setting circuitry configured to set information of the movable path estimated by the movable path estimation circuitry as one of parameters used for the multi-camera object tracking.

In the above configuration, by receiving an input of captured images from a plurality of cameras, a movable path can be estimated on the basis of the input captured images from the plurality of cameras, and information of the estimated movable path can be set as one of parameters used for multi-camera object tracking. In this manner, it is possible to automatically set the information of the movable path necessary for performing multi-camera object tracking with limitation of the movable path, and thus it is possible to save time and effort to manually set the information of the movable path and to suppress economic and temporal costs. Furthermore, by using the information of the movable path, the multi-camera object tracking with limitation of the movable path can be performed on the captured images from the plurality of cameras. Thus, as compared with a case where the multi-camera object tracking is performed without limitation of the movable path, the multi-camera object tracking can be performed by narrowing (limiting) paths (paths between the cameras) down to a path on which a person is able to move, so that accurate and high-speed multi-camera object tracking processing can be achieved.

A multi-camera object tracking system according to a second aspect of the present invention includes an input circuitry configured to receive an input of captured images from a plurality of cameras, a multi-camera object tracking circuitry configured to perform multi-camera object tracking of tracking a plurality of tracking target objects across photographing ranges of the plurality of cameras on the basis of captured images from the plurality of cameras, a movable path estimation circuitry configured to perform multi-camera object tracking by the multi-camera object tracking circuitry without limitation of a movable path, which is a path between cameras on which a person is able to move, on captured images of a predetermined period from the plurality of cameras, and estimate a movable path, which is a path between cameras on which a person is able to move, from statistical information of tracking results of the tracking, and a setting circuitry configured to set information of the movable path estimated by the movable path estimation circuitry as one of parameters used for the multi-camera object tracking with limitation of the movable path, in which the multi-camera object tracking system performs multi-camera object tracking by the multi-camera object tracking circuitry with limitation of the movable path on the captured images from the plurality of cameras by using the information of the movable path set by the setting circuitry.

In the above configuration, it is possible to save time and effort to manually set the information of the movable path and to suppress economic and temporal costs. Furthermore, as described above, the multi-camera object tracking with limitation of the movable path is performed on the captured images from the plurality of cameras using the information of the movable path, so that it is possible to perform the multi-camera object tracking by narrowing (limiting) the paths (the paths between the cameras) down to a path on which a person is able to move as compared with the case where the multi-camera object tracking is performed without limitation of the movable path, and thus accurate and high-speed multi-camera object tracking processing can be achieved.

An object tracking system according to a third aspect of the present invention includes a single camera object tracking circuitry configured to perform single camera object tracking of tracking one or more tracking target objects within a photographing range of one camera on the basis of a captured image from the one camera, and a region of interest estimation circuitry configured to perform the single camera object tracking by the single camera object tracking circuitry on a captured image of the one camera in a predetermined period, and estimate a region of interest that is a region through which a tracking target object is able to pass or a region through which the tracking target object is unable to pass in a capturing range of the one camera from statistical information of a tracking result of the tracking.

In the above configuration, the object tracking can be performed by limiting the region through which the tracking target person is able to pass with reference to the information of the estimated region of interest, so that the more accurate and high-speed object tracking processing can be achieved.

A non-transitory computer readable recording medium for recording an object tracking parameter setting support program according to a fourth aspect of the present invention records an object tracking parameter setting support program to cause a computer to execute a process including the steps of receiving an input of captured images from a plurality of cameras, performing multi-camera object tracking of tracking a plurality of tracking target persons across photographing ranges of the plurality of cameras without limitation of a movable path that is a path between cameras on which a person is able to move with respect to captured images in a predetermined period from the plurality of cameras, estimating the movable path from statistical information of the multi-camera object tracking result, and setting information of the estimated movable path as one of parameters used for multi-camera object tracking with limitation of the movable path.

An effect similar to that of the object tracking parameter setting support system according to the first aspect can be obtained using the object tracking parameter setting support program recorded in the recording medium.

A non-transitory computer readable recording medium for recording a multi-camera object tracking program according to a fifth aspect of the present invention records a multi-camera object tracking program to cause a computer to execute a process including the steps of receiving an input of captured images from a plurality of cameras, performing multi-camera object tracking of tracking a plurality of tracking target persons across photographing ranges of the plurality of cameras without limitation of a movable path that is a path between cameras on which a person is able to move with respect to captured images in a predetermined period from the plurality of cameras, estimating the movable path from statistical information of the multi-camera object tracking result, setting information of the estimated movable path as one of parameters used for multi-camera object tracking with limitation of the movable path, and performing the multi-camera object tracking with limitation of the movable path on the captured images from the plurality of cameras using information of the set movable path.

An effect similar to that of the multi-camera object tracking system according to the second aspect can be obtained using the multi-camera object tracking program recorded in the recording medium.

A non-transitory computer readable recording medium according to a sixth aspect of the present invention records an object tracking program to cause a computer to execute a process including the steps of single camera object tracking of tracking one or more tracking target objects within a photographing range of one camera is performed on the basis of a captured image from the one camera, and performing the single camera object tracking on a captured image of the one camera in a predetermined period, and estimating a region of interest that is a region through which a tracking target object is able to pass or a region through which the tracking target object is unable to pass in a photographing range of the one camera from statistical information of a tracking result of the tracking.

An effect similar to that of the object tracking system according to the third aspect can be obtained using the object tracking program recorded in the recording medium.

BRIEF DESCRIPTION OF THE DRAWINGS

FIG. 4 is an explanatory diagram of an outline of multi-camera object tracking processing;

FIG. 7 is an explanatory diagram illustrating an example in which parameters of the spatial information are described in graph information representing a relationship between fixed cameras;

FIG. 9 is an explanatory diagram of an example of estimation processing of edge information (movable path) in the object tracking parameter setting support system;

DETAILED DESCRIPTION OF THE INVENTION

Figure 1:
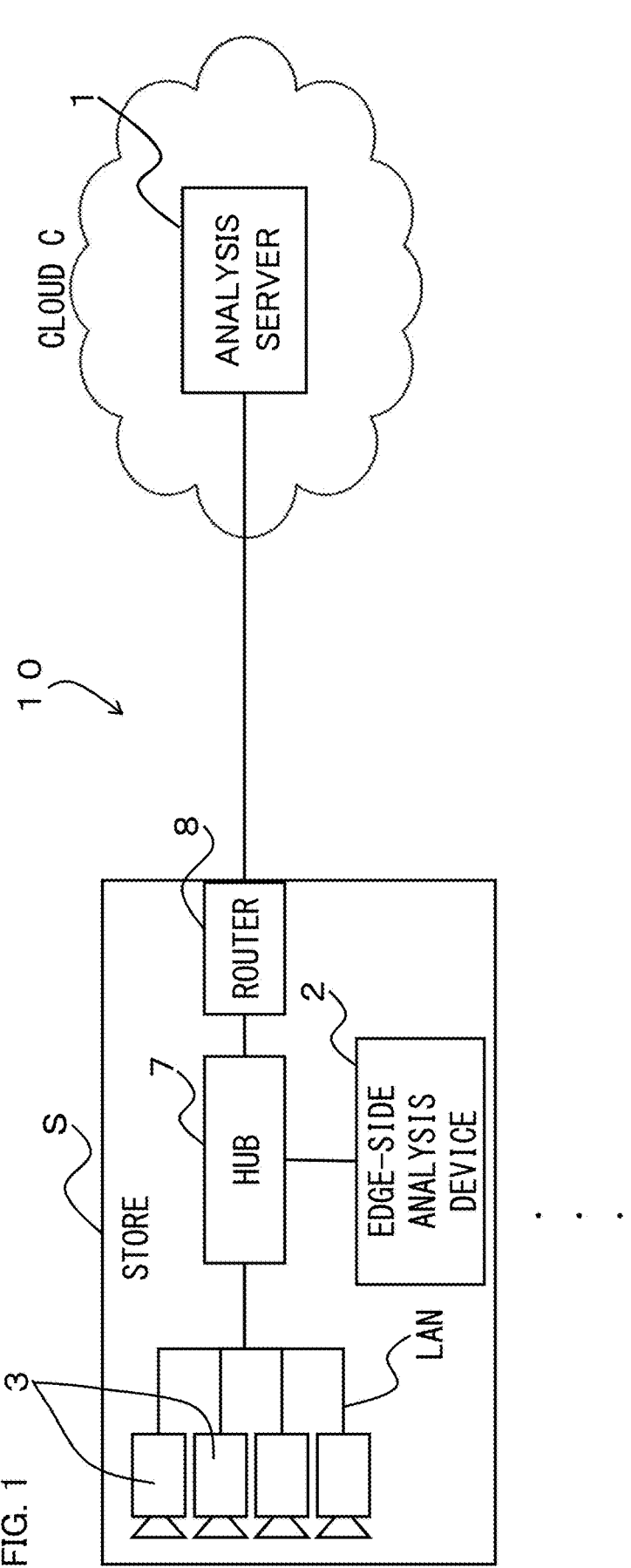
FIG. 1 is a block configuration diagram illustrating a schematic configuration of a multi-camera object tracking system according to an embodiment of the present invention.

Hereinafter, an object tracking parameter setting support system, a multi-camera object tracking system, an object tracking system, an object tracking parameter setting support program, a multi-camera object tracking program, and an object tracking program according to an embodiment embodying the present invention will be described with reference to the drawings. FIG. 1 is a block configuration diagram illustrating a schematic configuration of a multi-camera object tracking system 10 according to the present embodiment. As illustrated in FIG. 1, in the present embodiment, an example will be described in which a plurality of fixed cameras 3 (corresponding to "cameras" in the claims), which are monitoring network cameras that capture a predetermined capturing area, and an edge-side analysis device 2 that analyzes a video from each fixed camera 3 are arranged in a store S (corresponding to a "facility" in the claims) such as a chain store.

The multi-camera object tracking system 10 mainly includes the plurality of fixed cameras 3 and the edge-side analysis device 2 installed in each store S described above, and an analysis server 1 (corresponding to a "computer" in the claims) arranged on a cloud C. The edge-side analysis device 2 and the analysis server 1 are connected via the Internet.

As illustrated in FIG. 1, the multi-camera object tracking system 10 includes a hub 7 and a router 8 in the store S in which the fixed camera 3 and the edge-side analysis device 2 described above are arranged. Note that, in the following description, an example in which the fixed camera 3 and the edge-side analysis device 2 are separate bodies will be described, but the camera in the multi-camera object tracking system of the present invention may be a so-called AI camera in which the fixed camera 3 and the edge-side analysis device 2 described above are integrated.

The above-described fixed camera 3 has an IP address and can be directly connected to a network. As illustrated in FIG. 1, the edge-side analysis device 2 is connected to the plurality of fixed cameras 3 via a local area network (LAN) and the hub 7, and analyzes an image input from each of the fixed cameras 3. More specifically, the edge-side analysis device 2 performs object detection processing (specifically, processing of detecting a person (bounding box)) on an image input from each of the fixed cameras 3, processing of cutting out an image of a person detected in the object detection processing and extracting a feature vector from the cut out image of the person, and the like.

The above-described analysis server 1 is a server installed in a management department (head office or the like) that manages each store S in a centralized manner. Although details will be described later, the analysis server 1 performs multi-camera object tracking processing that is processing of tracking a plurality of tracking target persons across photographing ranges of a plurality of cameras while considering occlusion (a state in which an object in front hides an object behind from view) by using information (position and size) of a bounding box of each person (each object) transmitted from the edge-side analysis device 2 installed in each store S and a feature vector of each person. In addition, the analysis server 1 includes an object tracking parameter setting support system 40 (see FIG. 5), and obtains and sets parameters of various types of spatial information used for the above-described multi-camera object tracking processing on the basis of input captured images from the plurality of fixed cameras 3 and data of a two-dimensional store map.

Figure 2:
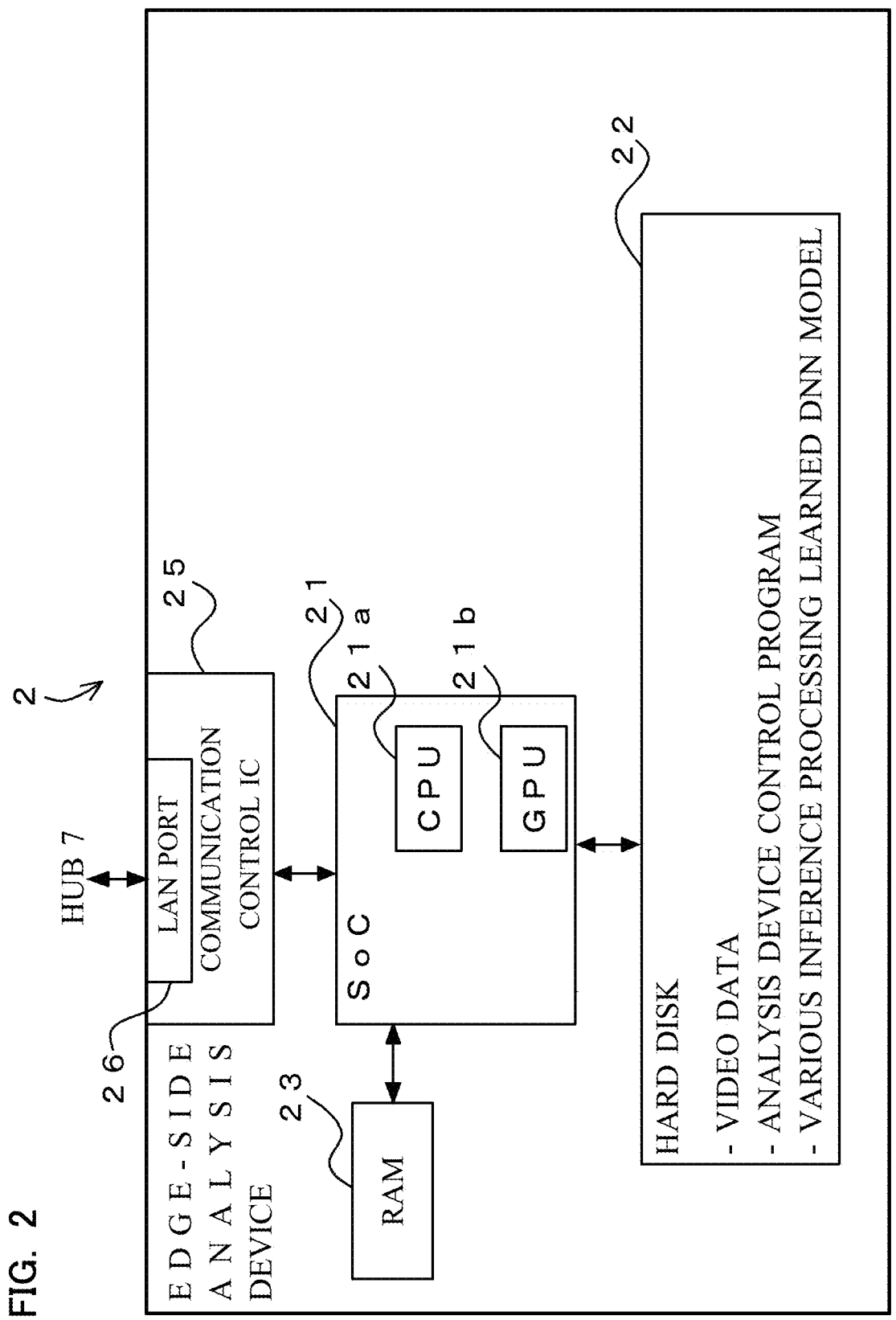
FIG. 2 is a block diagram illustrating a schematic hardware configuration of an edge-side analysis device of the multi-camera object tracking system.

Next, a hardware configuration of the edge-side analysis device 2 will be described with reference to FIG. 2. The edge-side analysis device 2 includes a system-on-a-chip (SoC) 21, a hard disk 22 that stores various data and programs, a random access memory (RAM) 23, and a communication control IC 25. The SoC 21 includes a CPU 21a that controls the entire device and performs various operations, and a GPU 21b used for inference processing and the like of learned deep neural network (DNN) models for various inference processing including the object detection processing and the feature vector extraction processing described above. Further, the data stored in the hard disk 22 includes video data obtained by decoding (the data of) a video stream input from each of the fixed cameras 3. In addition, the program stored in the hard disk 22 includes the various learned DNN models for inference processing (various inference processing learned DNN models) including the object detection processing and the feature vector extraction processing described above, and an analysis device control program.

Figure 3:
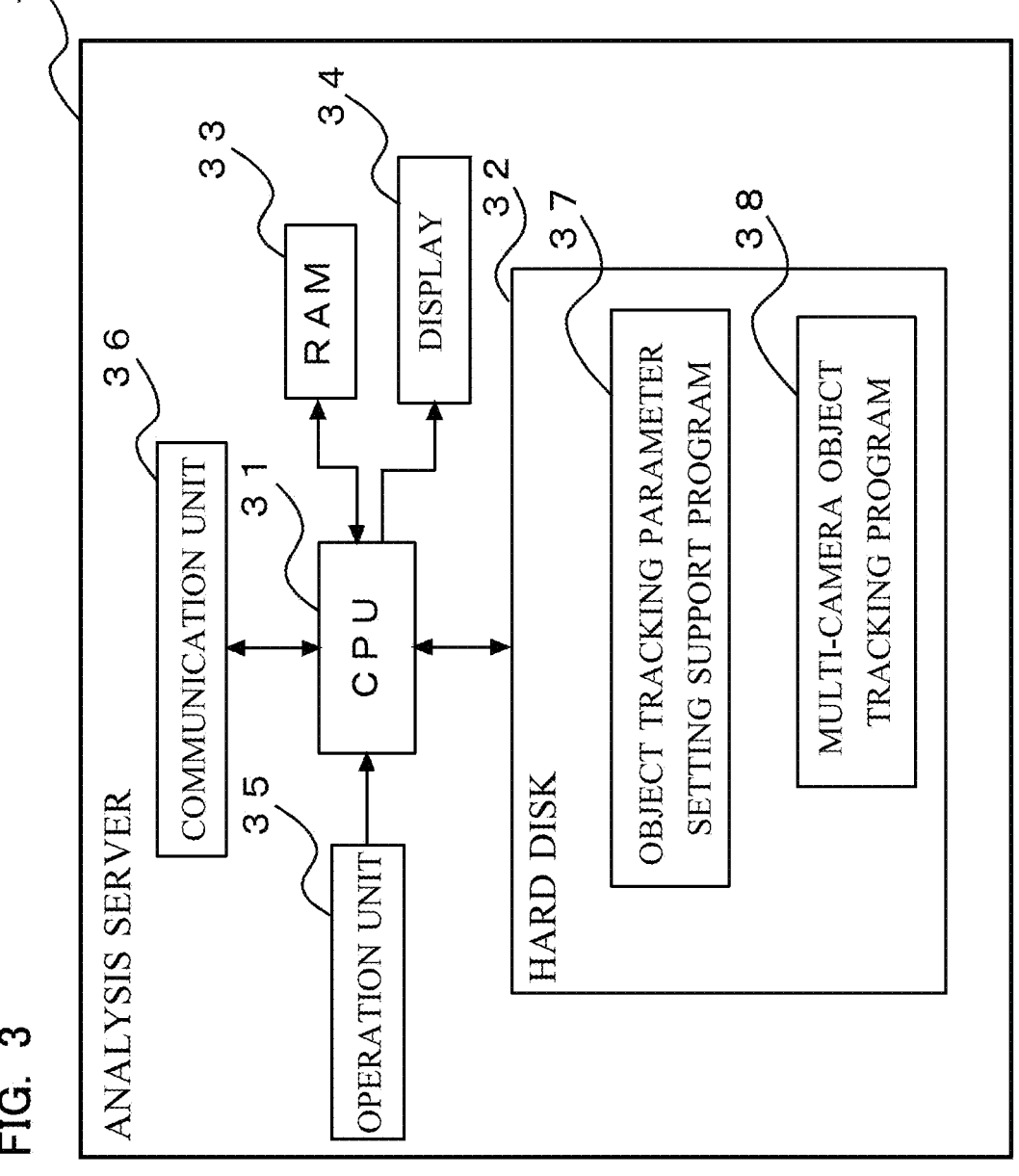
FIG. 3 is a block diagram illustrating a schematic hardware configuration of an analysis server of the multi-camera object tracking system.

Next, a hardware configuration of the analysis server 1 will be described with reference to FIG. 3. The analysis server 1 includes a CPU 31 that controls the entire device and performs various calculations, a hard disk 32 that stores various data and programs, a random access memory (RAM) 33, a display 34, an operation unit 35, and a communication unit 36. Programs stored in the above-described hard disk 32 include an object tracking parameter setting support program 37 and a multi-camera object tracking program 38.

Next, an outline of the above-described multi-camera object tracking processing will be described. This multi-camera object tracking processing is processing of tracking a plurality of tracking target objects (in the present embodiment, a person) across photographing ranges of a plurality of cameras (in the present embodiment, the fixed camera 3) while considering occlusion. As illustrated in FIG. 4, this processing is processing of tracking a plurality of persons across photographing ranges of the plurality of fixed cameras 3 by repeating processing of determining whether or not persons appearing in captured images of different fixed cameras 3 are the same person using captured images of the plurality of fixed cameras 3 (in the example of FIG. 4, three fixed cameras 3a to 3c). Through this tracking processing, it is possible to know what kind of path each person has followed in the store S.

The processing of determining whether or not the persons appearing in the captured images of the above-described different fixed cameras 3 are the same person is performed, for example, in the following manner in consideration of consistency between the time of camera transition of the object and the current position of the object. As illustrated in the query X of FIG. 4, for persons (person 1 and person 2) appearing in the captured image of the fixed camera 3b at 15:00, matching is performed only with a person passing through the photographing range of the fixed camera 3a (appearing in the captured image of the fixed camera 3a) within 2 minutes (14:58 to 15:00). Thus, it is possible to know that the person 1 has moved from the photographing range of the fixed camera 3a to the photographing range of the fixed camera 3b. Furthermore, as illustrated in the query Y of FIG. 4, for the person (person 3) appearing in the captured image of the fixed camera 3c at 16:00, matching is performed only with a person passing through the photographing range of the fixed camera 3a within 10 minutes (15:50 to 16:00) (appearing in the captured image of the fixed camera 3a) and a person passing through the fixed camera 3b within 2 minutes (14:58 to 15:00) (appearing in the captured image of the fixed camera 3b). Thus, it is possible to know that the person 3 has moved from the photographing range of the fixed camera 3a to the photographing range of the fixed camera 3c.

Figure 5:
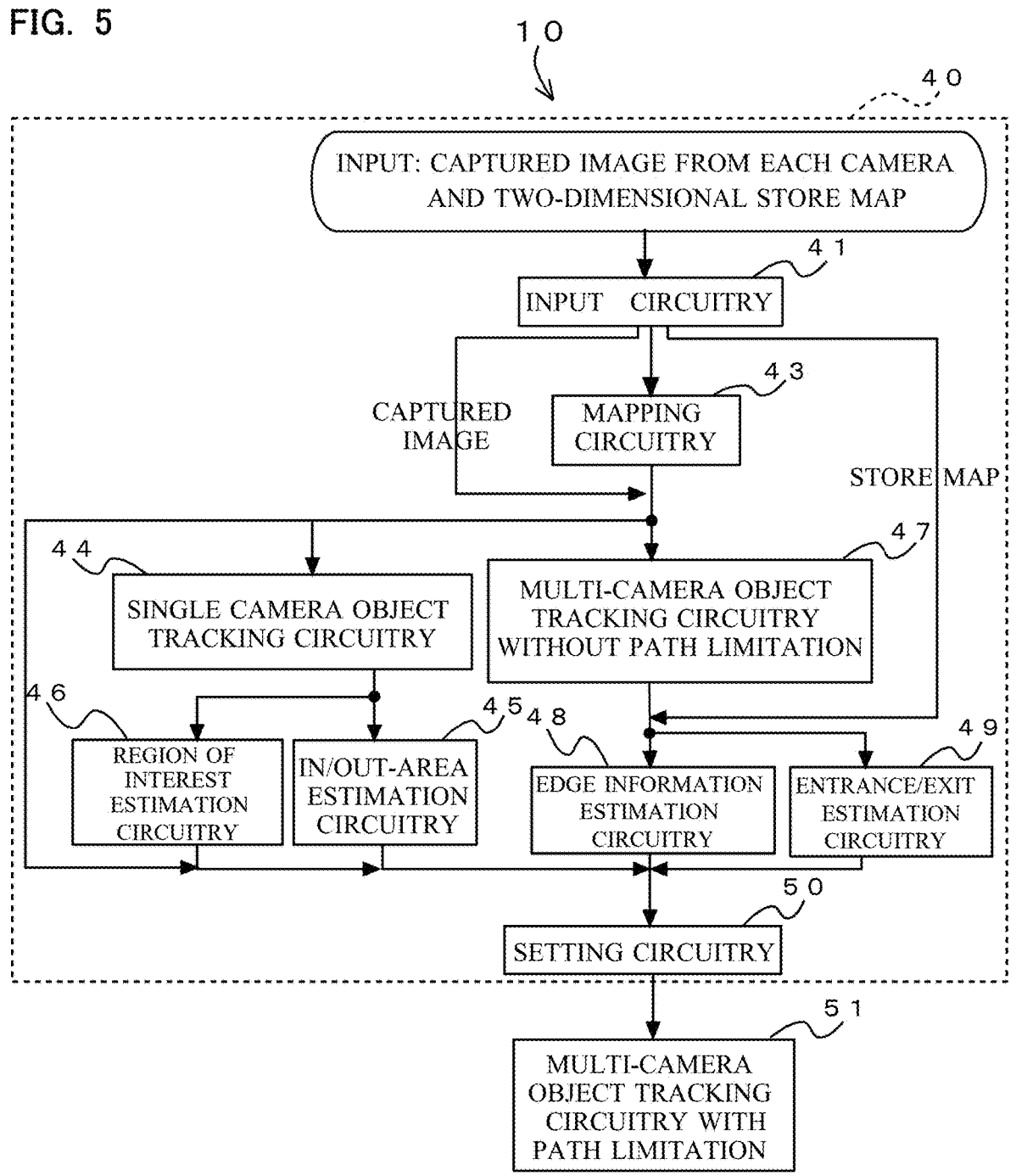
FIG. 5 is a diagram illustrating an input/output relationship of each block related to parameter setting processing used for multi-camera object tracking among functional blocks of a CPU of the analysis server of FIG. 3.

Next, an outline of setting processing of multi-camera object tracking parameter performed by the above-described analysis server 1 will be described with reference to FIG. 5. FIG. 5 illustrates an input/output relationship of each block (that is, each of the blocks constituting the object tracking parameter setting support system 40) related to (automatic)

setting processing of parameters (various types of spatial information) used for multi-camera object tracking and a block related to multi-camera object tracking processing with path limitation among functional blocks of the CPU 31 of the analysis server 1. An input circuitry 41, a mapping circuitry 43, a single camera object tracking circuitry 44, an in/out-area estimation circuitry 45, a region of interest estimation circuitry 46, an edge information estimation circuitry 48, an entrance/exit estimation circuitry 49, and a setting circuitry 50 in FIG. 5 correspond to an input circuitry, a mapping circuitry, a single camera object tracking circuitry, an in/out-area estimation circuitry, a region of interest estimation circuitry, a movable path estimation circuitry, an entrance/exit estimation circuitry, and a setting circuitry in the claims, respectively. Furthermore, the multi-camera object tracking circuitry 47 without path limitation and the multi-camera object tracking circuitry 51 with path limitation in FIG. 5 correspond to multi-camera object tracking circuitry in the claims.

Figure 6:
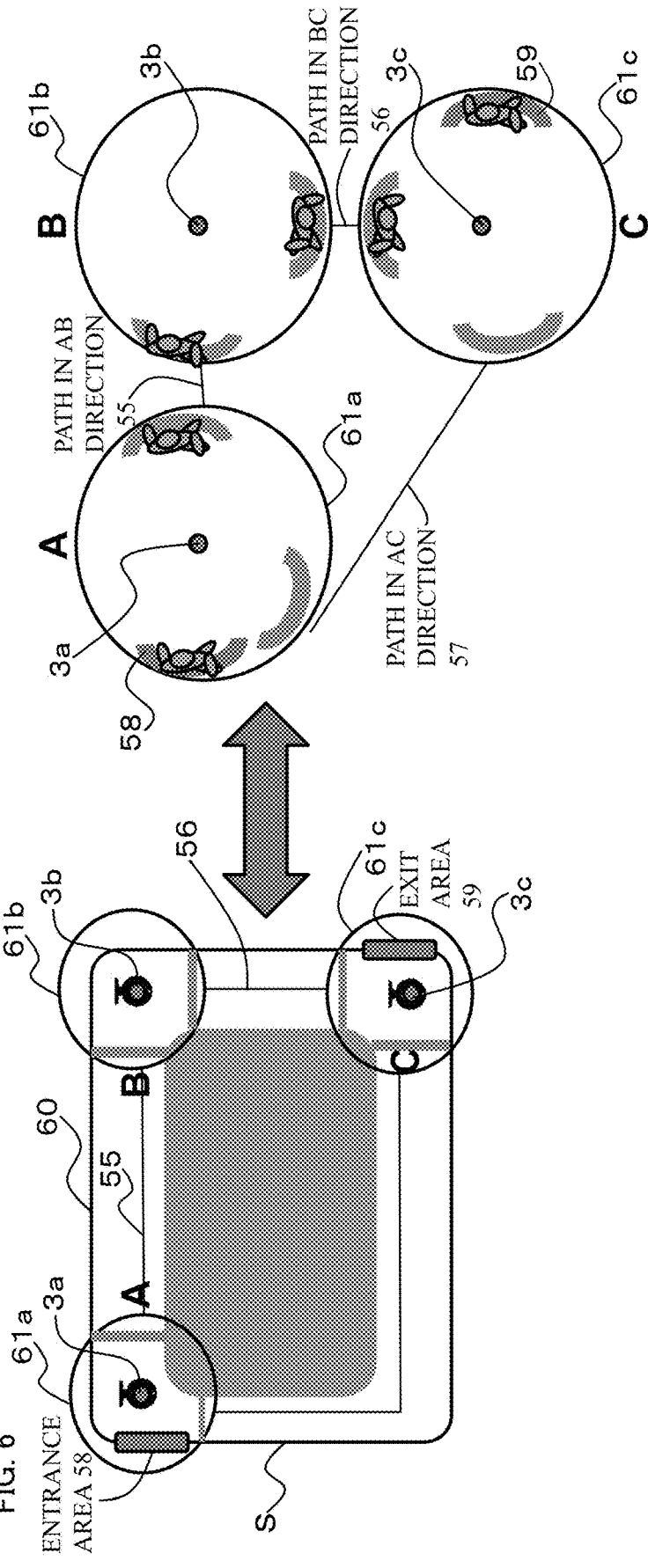
FIG. 6 is an explanatory diagram of parameters of spatial information set by the object tracking parameter setting support system according to the embodiment of the present invention.

The above-described input circuitry 41 receives an input of a captured image from each of the plurality of fixed cameras 3 (for example, in FIG. 4, the fixed cameras 3a to 3c) and data of a two-dimensional map (hereinafter, referred to as a "two-dimensional store map") of a shop in which the plurality of fixed cameras 3 described above is arranged. The two-dimensional store map is, for example, a map of a store (two-dimensional store map 60) as illustrated in FIG. 6. Note that, in FIG. 6, the two-dimensional store map 60 is illustrated in a simplified manner for convenience of description.

The mapping circuitry 43 illustrated in FIG. 5 associates each point (each coordinate) in the captured image of each of the plurality of fixed cameras 3 with each point in the above-described two-dimensional store map 60.

Furthermore, the single camera object tracking circuitry 44 performs single camera object tracking, which is processing of tracking one or more tracking target persons within the photographing range of one camera, on the basis of a captured image from the above-described one camera (for example, the fixed camera 3a) among the plurality of fixed cameras 3. The in/out-area estimation circuitry 45 performs single camera object tracking by the single camera object tracking circuitry 44 on the captured image in a predetermined period of each of the plurality of fixed cameras 3, and estimates an in-area that is an area in which a person enters and an out-area that is an area in which a person exits in the photographing range of each of the plurality of fixed cameras 3 from statistical information of tracking results thereof. In addition, the region of interest estimation circuitry 46 performs the single camera object tracking by the single camera object tracking circuitry 44 on the captured image in the predetermined period of each of the plurality of fixed cameras 3, and estimates a region of interest which is a region through which the tracking target person is able to pass or a region through which the tracking target person is unable to pass in the photographing range of each of the plurality of fixed cameras 3 from the statistical information of tracking results.

In addition, the multi-camera object tracking circuitry 47 without path limitation in FIG. 5 performs multi-camera object tracking of tracking a plurality of tracking target persons across the photographing ranges of the plurality of fixed cameras 3 without limitation of the movable path with respect to the captured images of the predetermined period from the plurality of fixed cameras 3. Here, the above-described "movable path" means a path between the fixed cameras 3 on the two-dimensional store map 60 on which a person is able to move. Furthermore, the edge information estimation circuitry 48 estimates the above-described movable path from statistical information of multi-camera object tracking results by the above-described multi-camera object tracking circuitry 47 without path limitation. Note that the naming of the edge information estimation circuitry 48 is derived from the fact that each edge in a graph representing a path between the fixed cameras 3 on which a person is able to move is set as the above-described movable path in graph information representing a relationship between the fixed cameras 3 described later. Note that each node (Node) in the graph representing the above-described path between the fixed cameras 3 on which a person is able to move is each fixed camera 3. Reference numerals 55, 56, and 57 in FIG. 6 represent a path in an AB direction (that is, a path between the fixed camera 3a and the fixed camera 3b), a path in a BC direction (that is, a path between the fixed camera 3b and the fixed camera 3c), and a path in a AC direction (that is, a path between the fixed camera 3a and the fixed camera 3c), respectively.

In addition, the entrance/exit estimation circuitry 49 estimates an entrance area 58 and an exit area 59 (see FIG. 6) of the store S in which the plurality of fixed cameras 3 is arranged from the statistical information of the multi-camera object tracking results by the above-described multi-camera object tracking circuitry 47 without path limitation. Then, the setting circuitry 50 sets the in-area and the out-area estimated by the in/out-area estimation circuitry 45, the region of interest estimated by the region of interest estimation circuitry 46, the movable path estimated by the edge information estimation circuitry 48, the entrance and exit information (the entrance area 58 and the exit area 59) estimated by the entrance/exit estimation circuitry 49, and information of an association result (result of association between each point in a captured image of each fixed camera 3 and each point in the two-dimensional store map 60) performed by the mapping circuitry 43 as parameters used for multi-camera object tracking. Note that, for multi-camera object tracking by the multi-camera object tracking circuitry 47 without path limitation, information of single camera object tracking result by the single camera object tracking circuitry 44 is used. Thus, as described above, in a case where both the in-area and out-area and the region of interest estimated from statistical information of the single camera object tracking results and the movable path and the entrance and exit information (the entrance area 58 and the exit area 59) estimated from the statistical information of the multi-camera object tracking results without path limitation are set as parameters to be used for multi-camera object tracking, it is desirable to connect the multi-camera object tracking circuitry 47 without path limitation to the subsequent stage of the single camera object tracking circuitry 44 in series to reduce the calculation amount of the entire object tracking parameter setting support system 40.

Among the functional blocks of the CPU 31 of the analysis server 1 in FIG. 5, the input circuitry 41, the mapping circuitry 43, the single camera object tracking circuitry 44, the in/out-area estimation circuitry 45, the region of interest estimation circuitry 46, the multi-camera object tracking circuitry 47 without path limitation, the edge information estimation circuitry 48, the entrance/exit estimation circuitry 49, and the setting circuitry 50 constitute the object tracking parameter setting support system 40. In addition, the multi-camera object tracking circuitry 51 with path limitation in FIG. 5 performs multi-camera object tracking of tracking a plurality of tracking target persons across the photographing ranges of the plurality of fixed cameras 3 with limitation of the movable path on the basis of the captured images from the plurality of fixed cameras 3 on the basis of various multi-camera object tracking parameters set by the setting circuitry 50 of the object tracking parameter setting support system 40 described above. Note that the multi-camera object tracking processing by the multi-camera object tracking circuitry 51 with path limitation described above is actual multi-camera object tracking processing performed by the multi-camera object tracking system 10 on the basis of various multi-camera object tracking parameters set in advance by the object tracking parameter setting support system 40.

In order to ensure the accuracy and speed of the above-described actual multi-camera object tracking processing, it is very effective to utilize various types of spatial information including the information regarding the above-described movable path. In particular, in-information (information of an in-area which is an area where a person enters in a photographing range of each fixed camera 3) and out-information (information of an out-area which is an area where a person goes out in the photographing range of each fixed camera 3) to the photographing range of each fixed camera 3, and information of areas at the entrance and the exit of the store S (see the entrance area 58 and the exit area 59 in FIG. 6) are very important in addition to the above information regarding the movable path, and it is possible to implement accurate and high-speed multi-camera object tracking processing by performing the actual multi-camera object tracking processing with path limitation after setting these pieces of spatial information in advance.

As described above, in order to ensure the accuracy and processing speed of multi-camera object tracking, it is very effective to utilize various types of spatial information including information regarding a movable path. However, manually setting the above spatial information requires economical and temporal costs.

Therefore, in the object tracking parameter setting support system 40 of the present embodiment, the above-described various types of spatial information (including information regarding the movable path) are automatically obtained on the basis of the captured images from the plurality of fixed cameras 3 and the data of the two-dimensional store map 60, and the spatial information is described in graph information (see FIG. 7) expressing the relationship between the respective fixed cameras 3 (that is, various kinds of spatial information are automatically graphically structured and expressed). Then, the actual multi-camera object tracking processing with path limitation is performed using the graph information (the graph information is used as an input of the multi-camera object tracking processing), and thus it is possible to save time and effort to manually set the above-described spatial information, and to suppress economic and temporal costs. In addition, by using the above-described movable path, the in-information and the out-information, the information of the areas at the entrance and the exit, and the information of the region of interest, the path between the cameras on which a person is able to move, the area in which the person enters and the area in which the person exits (which may be a direction in which the person enters and a direction in which the person exits) in the photographing range of each fixed camera 3, the entrance and the exit of the store S, and the region through which the tracking target person is able to pass (or the region through which the tracking target person is unable to pass) are narrowed down, and the actual multi-camera object tracking processing with path limitation is performed, so that accurate and high-speed multi-camera object tracking processing can be performed.

Figure 8:
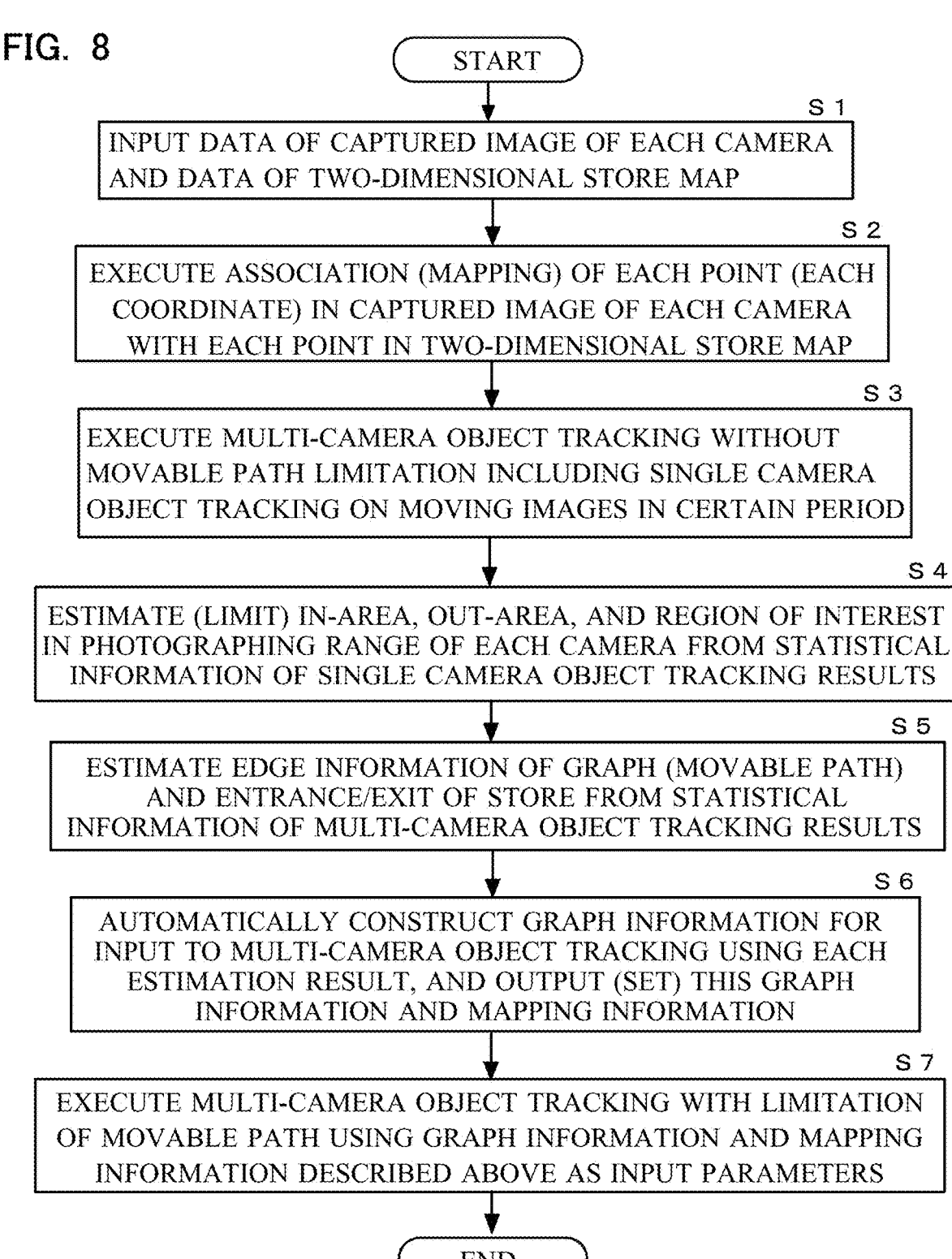
FIG. 8 is a flowchart of processing of the multi-camera object tracking system.
Figure 10:
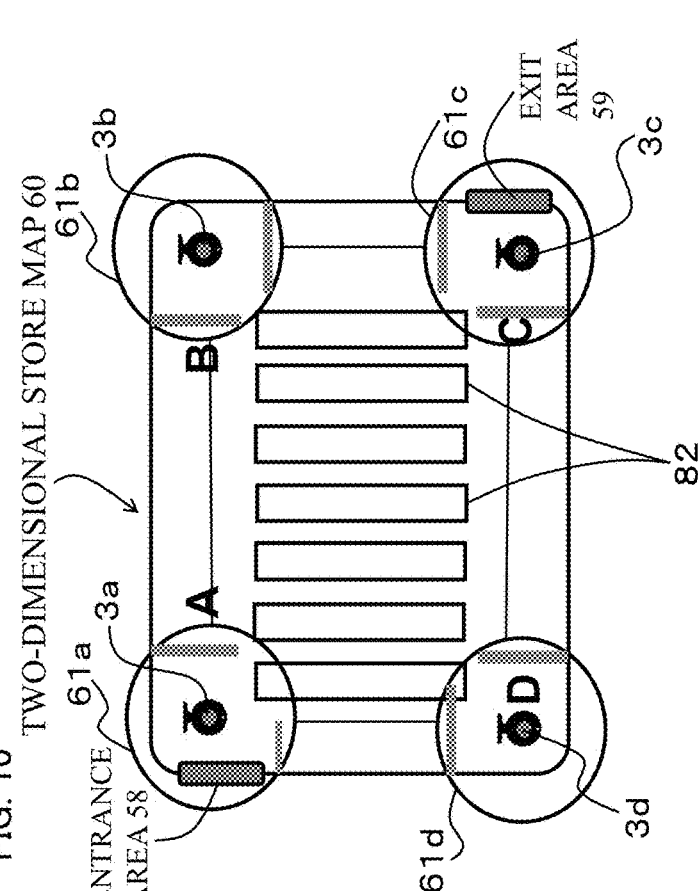
FIG. 10 is an explanatory diagram of estimation processing of an entrance area and an exit area in the object tracking parameter setting support system.

Next, in addition to a flowchart of FIG. 8, processing performed by the multi-camera object tracking system 10 of the present embodiment will be described with reference to FIGS. 5, 6, 7, 9, 10, and 11. Note that processing from S1 to S6 in the flowchart of FIG. 8 is processing performed by the object tracking parameter setting support system 40. First, the input circuitry 41 (see FIG. 5) of the analysis server 1 receives an input of the captured image from each fixed camera 3 and the data of the two-dimensional store map 60 described above (see FIGS. 6 and 7) (S1).

Next, the mapping circuitry 43 of the analysis server 1 performs association (mapping) of each point (each coordinate) in the captured image of each fixed camera 3 with each point in the two-dimensional store map 60 (S2). More specifically, the mapping circuitry 43 associates each point (for example, each coordinate of a captured image of a 360 degree camera (fisheye camera)) in the captured image of each fixed camera 3 arranged in the store with each point in the two-dimensional store map 60 using conversion by a mathematical formula on the basis of the installation location and height of each fixed camera 3.

Next, with reference to the result of the association (mapping) performed in the above-described S2, the multi-camera object tracking circuitry 47 without path limitation and the single camera object tracking circuitry 44 of the analysis server 1 perform multi-camera object tracking without movable path limitation including single camera object tracking on the captured images (moving images in a certain period) in a predetermined period from the plurality of fixed cameras 3 (S3).

Next, the in/out-area estimation circuitry 45 and the region of interest estimation circuitry 46 of the analysis server 1 estimate (limit) the in-area, the out-area, and the region of interest in the photographing range of each fixed camera 3 from the statistical information of single camera object tracking results by the single camera object tracking circuitry 44 (S4).

Figure 11:
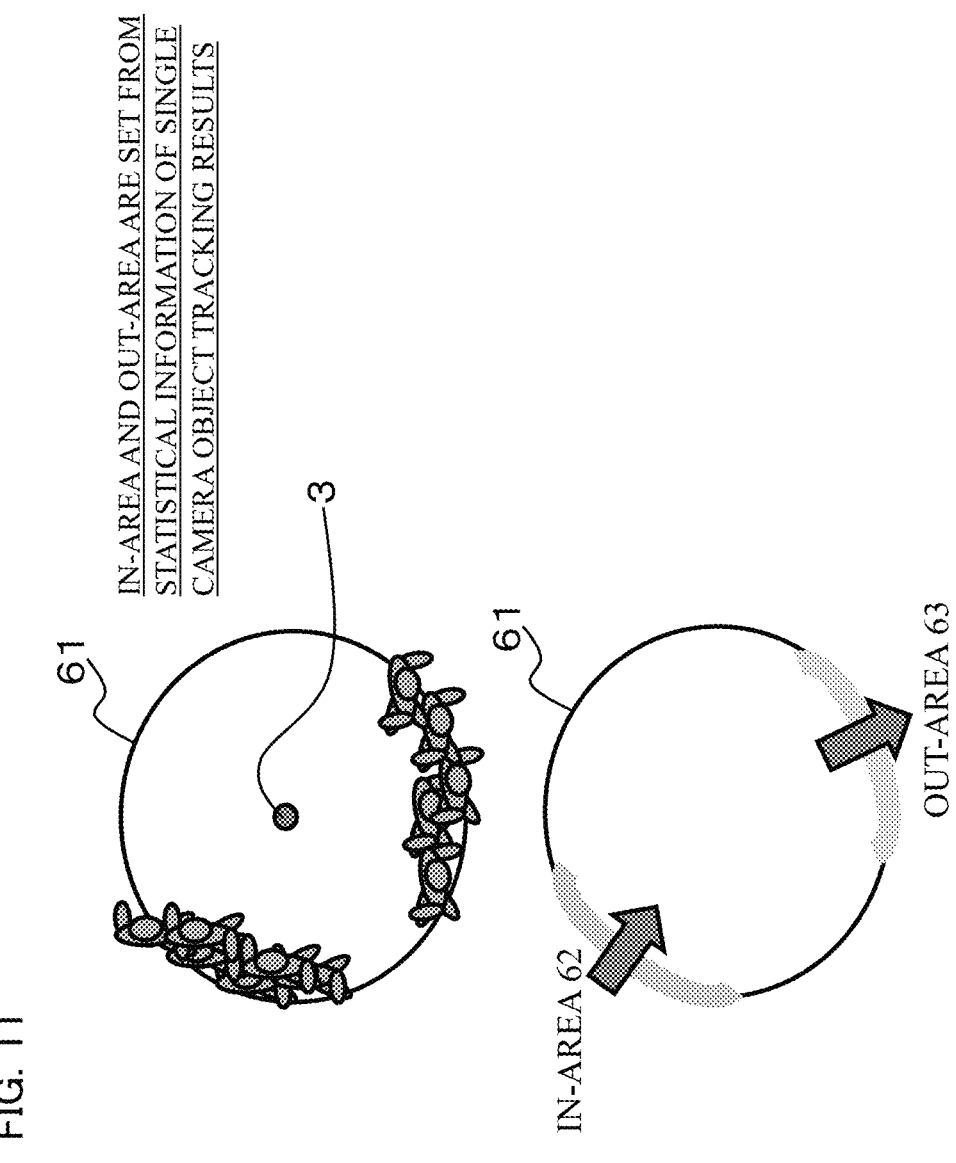
FIG. 11 is an explanatory diagram of estimation processing of an in-area and an out-area in the object tracking parameter setting support system.

First, estimation processing of the above-described in-area and out-area will be described. For example, as illustrated in FIG. 11, the in/out-area estimation circuitry 45 of the analysis server 1 estimates an in-area 62, which is an area where a person enters and an out-area 63, which is an area where a person exits, in a photographing range 61 of each fixed camera 3 from the statistical information of the single camera object tracking results by the single camera object tracking circuitry 44. Then, the in/out-area estimation circuitry 45 estimates an in-direction (direction in which a person enters (for example, "left", "right", and "down")) and an out-direction (direction in which a person exits (for example, "right" and "down")) for each node (for example, Node A (fixed camera 3a)) illustrated in FIG. 7 from estimation results of the in-area and out-area described above.

Next, estimation processing of a region of interest in S4 described above will be described. The region of interest estimation circuitry 46 of the analysis server 1 estimates a region of interest (ROI) which is a region through which the tracking target person is able to pass or a region through which the tracking target person is unable to pass in the photographing range 61 of each fixed camera 3 from the statistical information of the single camera object tracking results by the single camera object tracking circuitry 44. The region through which the tracking target person is unable to pass is, for example, a region where there is an obstacle (a product shelf or the like) in the photographing range of each fixed camera 3. In a case where the shape of the region is a square or a rectangle, the ROI (region of interest) is defined by a width (horizontal length), a height (vertical length), and an x coordinate and a y coordinate of the origin as illustrated in FIG. 7. Note that, as described above, when the shape of the ROI is a square or a rectangle, the origin is (the coordinates of) the upper left corner of the ROI, for example.

Next, the edge information estimation circuitry 48 of the analysis server 1 estimates the above-described movable path (edge information) and the entrance area 58 and the exit area 59 of the store S from the statistical information of the multi-camera object tracking results without path limitation by the above-described multi-camera object tracking circuitry 47 without path limitation (S5).

First, estimation processing of the above-described movable path will be described. For example, the edge information estimation circuitry 48 of the analysis server 1 estimates (determines) the above-described movable path by removing (excluding) paths equal to or less than a threshold in the statistical information 81 (see FIG. 9) of the above-described tracking results. More specifically, the edge information estimation circuitry 48 estimates the above-described movable path by removing, from candidates of the movable path, a path between the fixed cameras 3 through which fewer people have passed as a result of the multi-camera object tracking without path limitation by the above-described multi-camera object tracking circuitry 47 without path limitation. For example, in the case of the example illustrated in FIG. 9, since the threshold is 10, the edge information estimation circuitry 48 removes A→C (path from captured image A to captured image C (that is, a path from the fixed camera 3a to the fixed camera 3c)), B→D (path from captured image B to captured image D (that is, a path from the fixed camera 3b to the fixed camera 3d)), C→A (path from captured image C to image A (that is, a path from the fixed camera 3c to the fixed camera 3a)), and D→B (path from captured image D to captured image B (that is, a path from the fixed camera 3d to the fixed camera 3b)) from the candidates of the movable path, and estimates that the remaining path (A→B, A→D, B→A, B→C, C→B, C→D, D→A, and D→C) is the movable path. That is, the edge information estimation circuitry 48 estimates that the edge information (movable path) in the two-dimensional store map 60 of FIG. 9 is A⇔B, B⇔C, C⇔D, and A⇔D.

In the example illustrated in FIG. 9, the edge information (movable path) related to Node A (fixed camera 3a) is estimated to be A⇔B and A⇔D. In this example, since there are obstacles called shelves 82 in A⇔C (path connecting captured image A and captured image C (that is, the path connecting the fixed camera 3a and the fixed camera 3c)), a flow of people from the fixed camera 3a directly (linearly) toward the fixed camera 3c does not occur, and data of a tracking result (of people) passing through such a path (path) needs to be eliminated. Therefore, the edge information estimation circuitry 48 removes A⇔C (the path of A→C and the path of C→A) from the candidates of the edge information (movable path) of Node A (the fixed camera 3a).

Next, estimation processing of the entrance area 58 and the exit area 59 (see FIG. 10) in S5 described above will be described. The entrance/exit estimation circuitry 49 of the analysis server 1 estimates the entrance area 58 and the exit area 59 (see FIG. 10) of the store S in which the plurality of fixed cameras 3 is arranged from the statistical information of the multi-camera object tracking results by the above-described multi-camera object tracking circuitry 47 without path limitation. Then, from these estimation results, entrance/exit estimation circuitry 49 estimates entrance information and exit information (whether or not there are an entrance and an exit within the photographing range of each fixed camera 3 and directions thereof) for each node (for example, Node A (fixed camera 3*a*)).

For example, the entrance/exit estimation circuitry 49 of the analysis server 1 estimates (determines) the entrance area 58 and the exit area 59 by removing (excluding) routes equal to or less than a threshold from routes (drawn with one stroke) in statistical information 83 (see FIG. 10) of the multi-camera object tracking results by the above-described multi-camera object tracking circuitry 47 without path limitation. More specifically, the entrance/exit estimation circuitry 49 narrows down the entrance and exit routes described above by removing a route between the fixed cameras 3 where fewer people have passed as a result of the multi-camera object tracking without path limitation by the multi-camera object tracking circuitry 47 without path limitation described above from candidates for the route from the entrance area 58 to the exit area 59 (hereinafter, referred to as "entrance and exit route"). Then, the entrance/exit estimation circuitry 49 estimates (determines) the in-area 62, in which many people enter, and the out-area 63 (see FIG. 11), in which many people exit, as the entrance area 58 and the exit area 59. Note that these in-area 62 and out-area 63 correspond to the start point and the end point in the narrowed entrance and exit route, respectively. For example, in the case of the example illustrated in FIG. 10, since the threshold is set to 10, the entrance/exit estimation circuitry 49 narrows the entrance and exit routes down to ABC, ADC, ABADC, and ADABC by removing BCD (the route from the fixed camera 3*b* toward the fixed camera 3*d* via the fixed camera 3*c*), BAC (the route from the fixed camera 3*b* toward the fixed camera 3*c* via the fixed camera 3*a*), and CBA (the route from the fixed camera 3*c* toward the fixed camera 3*a* via the fixed camera 3*b*) from the above-described candidates of the entrance and exit route. The respective fixed cameras 3 corresponding to the start point and the end point in each of the above-described narrowed entrance and exit routes (ABC, ADC, ABADC, and ADABC) are the fixed camera 3*a* and the fixed camera 3*c*. Using the above-described statistical information of the single camera object tracking results, the entrance/exit estimation circuitry 49 estimates (determines) the in-area 62 (see FIG. 11) having a large number of entering people in a photographing range 61*a* at the start point (fixed camera 3*a*) of the above-described narrowed entrance and exit route as the entrance area 58, and estimates (determines) the out-area 63 (see FIG. 11) having a large number of exiting people in a photographing range 61*c* at the end point (fixed camera 3*c*) of the above-described narrowed entrance and exit route as the exit area 59.

Next, the setting circuitry 50 of the analysis server 1 automatically constructs graph information 80 for input to the multi-camera object tracking using information (the in-direction and out-direction, the ROI (region of interest), the edge information (movable path), and the entrance information and exit information (entrance area and exit area)) of estimation results by the processing of S4 and S5, and sets (outputs) the graph information 80 and the information (hereinafter, referred to as "mapping information") of the association result between each point of the captured image of each fixed camera 3 estimated in S2 and each point in the two-dimensional store map 60 as parameters used for multi-camera object tracking (S6).

Then, the multi-camera object tracking circuitry 51 with path limitation of the analysis server 1 (see FIG. 5) executes the multi-camera object tracking with limitation of the movable path using the above-described graph information 80 and the mapping information described above as input parameters (S7).

Here, a specific example of the above-described graph information 80 will be described in detail with reference to FIG. 7. For example, it is assumed that the fixed cameras arranged in the store S are three fixed cameras 3*a*, 3*b*, and 3*c*, they are arranged as illustrated in the two-dimensional store map 60 on the left side of FIG. 7, and there is an obstacle called the shelves 82 on the path connecting the fixed cameras 3*a* and 3*c*. In this case, the graph information 80 includes graph information regarding Node A (fixed camera 3*a*), graph information regarding Node B (fixed camera 3*b*), and graph information regarding Node C (fixed camera 3*c*). Then, in the case of the example illustrated in FIG. 7, the edge information (movable path) in the graph information regarding the Node A (fixed camera 3*a*) is A⇔B, the in-direction is left, right, and down, the out-direction is right and down, the entrance information is "entrance present (left)" (information that there is an entrance within the photographing range of the fixed camera 3*a*, and the entrance is on the left side), the exit information is "no exit" (information indicating that there is no exit within the photographing range of the fixed camera 3*a*), and the ROI (region of interest) is information regarding the region defined by the width, the height, and the x coordinate and the y coordinate of the origin.

As described above, according to the object tracking parameter setting support system 40 of the present embodiment, by inputting the captured images from the plurality of fixed cameras 3 and the data of the map (two-dimensional store map 60) of the store S in which these fixed cameras 3 are arranged, a movable path (edge information) is estimated on the basis of the input captured images from the plurality of fixed cameras 3 and the data of the two-dimensional store map 60, and information of the estimated movable path can be set as one of the parameters used for multi-camera object tracking. In this manner, it is possible to automatically set the information of the movable path necessary for performing the multi-camera object tracking with limitation of the movable path, and thus it is possible to save time and effort to manually set the information of the movable path and to suppress economic and temporal costs. Furthermore, by using the above-described information of the movable path, the multi-camera object tracking with limitation of the movable path can be performed on the captured images from the plurality of fixed cameras 3. In this manner, as compared with a case where the multi-camera object tracking is performed without limitation of the movable path, the multi-camera object tracking can be performed by narrowing (limiting) paths (paths between fixed cameras) down to a path on which a person is able to move, and thus accurate and high-speed multi-camera object tracking processing can be achieved.

In addition, according to the object tracking parameter setting support system 40 of the present embodiment, the single camera object tracking is performed on the captured image of each fixed camera 3 in the predetermined period, the in-area 62, which is an area where a person enters and the out-area 63, which is an area where a person exits, in the photographing range 61 of each fixed camera 3 are estimated from the statistical information of the tracking results, and the information of the in-area 62 and the out-area 63 is set as one of the parameters used for the multi-camera object tracking. In this manner, it is possible to automatically set the in-area 62, which is an area where a person enters and the out-area 63, which is an area where a person exits, in the photographing range 61 (in the example illustrated in the graph information 80 of FIG. 7, the direction in which a person enters (in-direction) and the direction in which a person exits (out-direction) in the photographing range are illustrated), and thus it is possible to save time and effort to manually set information of the in-area 62 and the out-area 63 (or a direction in which a person enters (in-direction) and a direction in which a person exits (out-direction)), and to suppress economic and temporal costs. Furthermore, by using the above-described information of the in-area 62 and the out-area 63 (or the direction in which a person enters and the direction in which a person exits), the multi-camera object tracking can be performed by limiting the in-area 62 and the out-area 63 (or the direction in which a person enters and the direction in which a person exits) in the photographing range 61, and thus more accurate and high-speed multi-camera object tracking processing can be achieved.

In addition, according to the object tracking parameter setting support system 40 of the present embodiment, the multi-camera object tracking without movable path limitation is performed on captured images in the predetermined period from the plurality of fixed cameras 3, the entrance information and the exit information of the store S are estimated from the statistical information of the tracking results, and the estimated entrance information and exit information are set as one of the parameters used for the multi-camera object tracking. In this manner, the entrance information and the exit information of the store S can be automatically set, and thus it is possible to save time and effort to manually set the entrance information and the exit information, and to suppress economic and temporal costs. Furthermore, by using the entrance information and the exit information described above, multi-camera object tracking can be performed by limiting the entrance and the exit of the store S, and thus more accurate and high-speed multi-camera object tracking processing can be achieved.

In addition, according to the object tracking parameter setting support system 40 of the present embodiment, the single camera object tracking is performed on the captured image of each fixed camera 3 in the predetermined period, the region of interest (ROI) that is the region through which the tracking target person is able to pass or the region through which the tracking target person is unable to pass in the photographing range 61 of each fixed camera 3 is estimated from the statistical information of the tracking results, and information of the estimated region of interest is set as one of the parameters used for the multi-camera object tracking. In this manner, the above-described information of the region of interest can be automatically set, and thus it is possible to save time and effort to manually set the information of the region of interest and to suppress economic and temporal costs. Furthermore, by using the above-described information of the region of interest, multi-camera object tracking can be performed by limiting the region through which the tracking target person is able to pass with reference to the above-described information of the region of interest, and thus more accurate and high-speed multi-camera object tracking processing can be achieved.

Furthermore, according to the object tracking parameter setting support system 40 of the present embodiment, each point (each coordinate) in the captured image of each fixed camera 3 is associated (mapped) with each point in the two-dimensional store map 60, and information (mapping information) of the association result is set as one of the parameters used for the multi-camera object tracking. In this manner, the above-described information of the association result (mapping information) can be automatically set, and thus it is possible to save time and effort to manually set the mapping information and to suppress economic and temporal costs.

In addition, according to the object tracking parameter setting support system 40 of the present embodiment, the multi-camera object tracking without movable path limitation is performed on the captured images in the predetermined period from the plurality of fixed cameras 3, and the path between the cameras where fewer people have passed as a result of the tracking is removed from the candidates of the movable path, thereby estimating the movable path. Thus, the information of the movable path necessary for performing the multi-camera object tracking with limitation of the movable path can be easily and automatically set.

In addition, according to the multi-camera object tracking system 10 of the present embodiment, the multi-camera object tracking with limitation of the movable path is performed on the captured images from the plurality of fixed cameras 3 using the information of the movable path set by the above-described object tracking parameter setting support system 40. In this manner, it is possible to save time and effort to manually set the information of the movable path and to suppress economic and temporal costs. Furthermore, as described above, the multi-camera object tracking with limitation of the movable path is performed on the captured images from the plurality of fixed cameras 3 using the information of the movable path, so that it is possible to perform the multi-camera object tracking by narrowing (limiting) the paths (the paths between the fixed cameras) to a path on which a person is able to move as compared with the case where the multi-camera object tracking is performed without limitation of the movable path, and thus accurate and high-speed multi-camera object tracking processing can be achieved.

Modifications

Note that the present invention is not limited to the configuration of each of the above embodiments, and various modifications can be made without changing the gist of the invention. Next, a modification of the present invention will be described.

Modification 1

In the above embodiment, the example has been described in which the object tracking parameter setting support system 40 automatically sets all of the edge information (movable path), the entrance information and the exit information, the in-direction and the out-direction, the ROI (region of interest), and the above-described mapping information among the parameters of various types of spatial information necessary for securing the accuracy and processing speed of multi-camera object tracking, but the object tracking parameter setting support system of the present invention is not limited thereto. For example, among the parameters of the various types of spatial information described above, some parameters (for example, the entrance information and the exit information, and the in-direction and the out-direction) may be input in advance by the user of the analysis server using the operation unit, or parameters of spatial information transmitted from another computer may be used.

Modification 2

In the above embodiment, the example has been described in which the analysis server 1 performs the processing of all the functional blocks of the object tracking parameter setting support system 40 in FIG. 5, but the object tracking parameter setting support system of the present invention is not limited thereto. For example, the edge-side analysis device may perform the processing of the mapping circuitry, the single camera object tracking circuitry, the in/out-area estimation circuitry, and the region of interest estimation circuitry in FIG. 5, and the analysis server may set the mapping information (information of the association result between each point of the captured image of each fixed camera and each point in the two-dimensional store map) transmitted from the edge-side analysis device, information of the in-area and the out-area (the in-direction and the out-direction), and the ROI (region of interest) as parameters used for multi-camera object tracking.

Modification 3

In the above embodiment, the example has been described in which the edge-side device is (a combination of) the fixed camera 3 and the edge-side analysis device 2, but the edge-side device in the object tracking parameter setting support system of the present invention is not limited thereto, and may be, for example, a so-called AI camera, or may be (a combination of) a signage with a built-in camera and an edge-side analysis device.

Modification 4

In the above embodiment, as illustrated in FIG. 11, the in-area 62, which is an area where a person enters, and the out-area 63, which is an area where a person exits, in the photographing range 61 of each fixed camera 3 are estimated from the statistical information of the single camera object tracking results, and the in-direction and the out-direction for each node are estimated from estimation results of the in-area and the out-area. That is, in the above embodiment, an example has been described in which information of the in-area and the out-area in the object tracking parameter setting support system of the present invention is the in-direction and the out-direction. However, the information of the in-area and the out-area in the object tracking parameter setting support system of the present invention is not limited thereto, and may be, for example, coordinate information (region information) of the in-area and the out-area.

Modification 5

In the above embodiment, various parameters (for the actual multi-camera object tracking processing with path limitation) are automatically set from the statistical information of the multi-camera object tracking results without path limitation and the statistical information of the single camera object tracking results. However, the object tracking parameter setting support system of the present invention is not limited thereto, and similarly to the above, after various parameters are automatically set from the statistical information of results of the multi-camera object tracking without path limitation and the single camera object tracking, the multi-camera object tracking with limitation of the movable path is performed using these parameters, and various parameters (for the actual multi-camera object tracking processing with path limitation) may be reset from the statistical information of the multi-camera object tracking results with limitation of the movable path and the statistical information of the single camera object tracking results. Furthermore, various parameters for the actual multi-camera object tracking processing with path limitation may be automatically set from the statistical information of the multi-camera object tracking result with path limitation collected in advance and the statistical information of the single camera object tracking result.

Modification 6

In the above embodiment, the single camera object tracking is performed on the captured image of each fixed camera 3 in the predetermined period, the region of interest (ROI) that is the region through which the tracking target person is able to pass or the region through which the tracking target person is unable to pass in the photographing range 61 of each fixed camera 3 is estimated from the statistical information of the tracking results, and the information of the estimated region of interest is set as one of the parameters used for the multi-camera object tracking. However, the object tracking system of the present invention is not limited to this, and the information of the region of interest estimated from the statistical information of the single camera object tracking result can be used for various applications.

The invention claimed is:

1. An object tracking parameter setting support system comprising:
   input circuitry configured to receive an input of captured images from a plurality of cameras;
   multi-camera object tracking circuitry configured to perform multi-camera object tracking of tracking a plurality of tracking target objects across photographing ranges of the plurality of cameras on a basis of captured images from the plurality of cameras;
   movable path estimation circuitry configured to estimate a movable path by:
      performing the multi-camera object tracking by the multi-camera object tracking circuitry on captured images in a predetermined period, the captured images being from the plurality of cameras such that the plurality of cameras track freely, and
      removing a path between cameras on which fewer tracking target objects than a predetermined number of tracking target objects have moved, as a result of the multi-camera object tracking, the path being a candidate of the movable path; and
   setting circuitry configured to set information of the movable path estimated by the movable path estimation circuitry as a parameter used for the multi-camera object tracking.

2. The object tracking parameter setting support system according to claim 1, further comprising:
   single camera object tracking circuitry configured to perform single camera object tracking of tracking one or more tracking target objects within a photographing range of one of the plurality of cameras on a basis of a captured image from the one of the plurality of cameras; and
   in/out-area estimation circuitry configured to perform the single camera object tracking by the single camera object tracking circuitry on a captured image in a predetermined period, the captured images being from each of the plurality of cameras, and estimate an in-area that is an area in which a tracking target object enters and an out-area that is an area in which a tracking target object exits in a photographing range of each of the plurality of cameras,
   wherein the setting circuitry is further configured to set information of an in-area and an out-area estimated by the in/out-area estimation circuitry as a parameter used for the multi-camera object tracking.

3. The object tracking parameter setting support system according to claim 2, further comprising entrance/exit estimation circuitry configured to perform the multi-camera object tracking by the multi-camera object tracking circuitry on captured images in a predetermined period, the captured images being from the plurality of cameras, and estimate an entrance and an exit of a facility in which the plurality of cameras are arranged, wherein the setting circuitry is further configured to set information of an entrance and an exit estimated by the entrance/exit estimation circuitry as a parameter used for the multi-camera object tracking.

4. The object tracking parameter setting support system according to claim 1, further comprising mapping circuitry configured to associate each point in the captured images of each of the plurality of cameras with each point in a map of a facility in which the plurality of cameras are arranged, wherein the setting circuitry is further configured to set information of an association result by the mapping circuitry as a parameter used for the multi-camera object tracking.

5. A multi-camera object tracking system comprising:
input circuitry configured to receive an input of captured images from a plurality of cameras;
multi-camera object tracking circuitry configured to perform multi-camera object tracking of tracking a plurality of tracking target objects across photographing ranges of the plurality of cameras on a basis of captured images from the plurality of cameras;
movable path estimation circuitry configured to estimate a movable path by:
 performing the multi-camera object tracking by the multi-camera object tracking circuitry on captured images in a predetermined period, the captured images being from the plurality of cameras such that the plurality of cameras track freely, and
 removing a path between cameras on which fewer tracking target objects than a predetermined number of tracking target objects have moved, as a result of the multi-camera object tracking, the path being a candidate of the movable path; and
setting circuitry configured to set information of the movable path estimated by the movable path estimation circuitry as a parameter used for the multi-camera object tracking,
 wherein the multi-camera object tracking system performs the multi-camera object tracking by the multi-camera object tracking circuitry on the captured images from the plurality of cameras by using the information of the movable path set by the setting circuitry.

6. The multi-camera object tracking system according to claim 5, further comprising:
 single camera object tracking circuitry configured to perform single camera object tracking of tracking one or more tracking target objects within a photographing range of one of the plurality of cameras on a basis of a captured image from the one of the plurality of cameras; and
 in/out-area estimation circuitry configured to perform the single camera object tracking by the single camera object tracking circuitry on a captured image in a predetermined period, the captured images being from each of the plurality of cameras, and estimate an in-area that is an area in which a tracking target object enters and an out-area that is an area in which a tracking target object exits in a photographing range of each of the plurality of cameras,
 wherein the setting circuitry is further configured to set information of an in-area and an out-area estimated by the in/out-area estimation circuitry as a parameter used for the multi-camera object tracking.

7. The multi-camera object tracking system according to claim 6, further comprising entrance/exit estimation circuitry configured to perform the multi-camera object tracking by the multi-camera object tracking circuitry on captured images in a predetermined period, the captured images being from the plurality of cameras, and estimate an entrance and an exit of a facility in which the plurality of cameras are arranged,
 wherein the setting circuitry is further configured to set information of an entrance and an exit estimated by the entrance/exit estimation circuitry as a parameter used for the multi-camera object tracking.

8. The multi-camera object tracking system according to claim 5, further comprising mapping circuitry configured to associate each point in the captured images of each of the plurality of cameras with each point in a map of a facility in which the plurality of cameras are arranged,
 wherein the setting circuitry is further configured to set information of an association result by the mapping circuitry as a parameter used for the multi-camera object tracking.

9. A non-transitory computer readable recording medium for recording an object tracking parameter setting support program to cause a computer to execute a process including:
 receiving an input of captured images from a plurality of cameras;
 estimating a movable path by:
  performing multi-camera object tracking by multi-camera object tracking circuitry on captured images in a predetermined period, the captured images being from the plurality of cameras such that the plurality of cameras track freely, and
  removing a path between cameras on which fewer tracking target objects than a predetermined number of tracking target objects have moved, as a result of the multi-camera object tracking, the path being a candidate of the movable path; and
 setting information of the estimated movable path as a parameter used for multi-camera object tracking.

10. The non-transitory computer readable recording medium for recording an object tracking parameter setting support program of claim 8, the process further including:
 performing, via single camera object tracking circuitry, single camera object tracking of tracking one or more tracking target objects within a photographing range of one of the plurality of cameras on a basis of a captured image from the one of the plurality of cameras;
 performing, via in/out-area estimation circuitry, the single camera object tracking by the single camera object tracking circuitry on a captured image in a predetermined period, the captured images being from each of the plurality of cameras, and estimating, via the in/out-area estimation circuitry, an in-area that is an area in which a tracking target object enters and an out-area that is an area in which a tracking target object exits in a photographing range of each of the plurality of cameras; and
 setting information of an in-area and an out-area estimated by the in/out-area estimation circuitry as a parameter used for the multi-camera object tracking.

11. The non-transitory computer readable recording medium for recording an object tracking parameter setting support program of claim 10, the process further including:

performing, via entrance/exit estimation circuitry, the multi-camera object tracking by the multi-camera object tracking circuitry on captured images in a predetermined period, the captured images being from the plurality of cameras, and estimate an entrance and an exit of a facility in which the plurality of cameras are arranged; and setting information of an entrance and an exit estimated by the entrance/exit estimation circuitry as a parameter used for the multi-camera object tracking.

12. The non-transitory computer readable recording medium for recording an object tracking parameter setting support program of claim 9, the process further including:

associating, via mapping circuitry, each point in the captured images of each of the plurality of cameras with each point in a map of a facility in which the plurality of cameras are arranged; and setting information of an association result by the mapping circuitry as a parameter used for the multi-camera object tracking.

13. A non-transitory computer readable recording medium for recording a multi-camera object tracking program to cause a computer to execute a process including:

receiving an input of captured images from a plurality of cameras;

estimating a movable path by:

performing multi-camera object tracking by multi-camera object tracking circuitry on captured images in a predetermined period, the captured images being from the plurality of cameras such that the plurality of cameras track freely, and removing a path between cameras on which fewer tracking target objects than a predetermined number of tracking target objects have moved, as a result of the multi-camera object tracking, the path being a candidate of the movable path;

setting information of the estimated movable path as a parameter used for multi-camera object tracking; and performing the multi-camera object tracking on the captured images from the plurality of cameras by using information of the estimated movable path.

14. The non-transitory computer readable recording medium for recording a multi-camera object tracking program of claim 13, the process further including:

performing, via single camera object tracking circuitry, single camera object tracking of tracking one or more tracking target objects within a photographing range of one of the plurality of cameras on a basis of a captured image from the one of the plurality of cameras;

performing, via in/out-area estimation circuitry, the single camera object tracking by the single camera object tracking circuitry on a captured image in a predetermined period, the captured images being from each of the plurality of cameras, and estimating, via the in/out-area estimation circuitry, an in-area that is an area in which a tracking target object enters and an out-area that is an area in which a tracking target object exits in a photographing range of each of the plurality of cameras; and setting information of an in-area and an out-area estimated by the in/out-area estimation circuitry as a parameter used for the multi-camera object tracking.

15. The non-transitory computer readable recording medium for recording a multi-camera object tracking program of claim 14, the process further including:

performing, via entrance/exit estimation circuitry, the multi-camera object tracking by the multi-camera object tracking circuitry on captured images in a predetermined period, the captured images being from the plurality of cameras, and estimate an entrance and an exit of a facility in which the plurality of cameras are arranged; and setting information of an entrance and an exit estimated by the entrance/exit estimation circuitry as a parameter used for the multi-camera object tracking.

16. The non-transitory computer readable recording medium for recording a multi-camera object tracking program of claim 13, the process further including:

associating, via mapping circuitry, each point in the captured images of each of the plurality of cameras with each point in a map of a facility in which the plurality of cameras are arranged; and setting information of an association result by the mapping circuitry as a parameter used for the multi-camera object tracking.

* * * * *